US011472822B2

(12) United States Patent
Knott et al.

(10) Patent No.: US 11,472,822 B2
(45) Date of Patent: Oct. 18, 2022

(54) PROCESS FOR PURIFYING ACETOXYSILOXANES

(71) Applicant: Evonik Operations GmbH, Essen (DE)

(72) Inventors: Wilfried Knott, Essen (DE); Dagmar Windbiel, Essen (DE); Horst Dudzik, Essen (DE); Frauke Henning, Essen (DE); Jan Caßens, Datteln (DE)

(73) Assignee: Evonik Operations GmbH, Essen (DE)

( * ) Notice: Subject to any disclaimer, the term of this patent is extended or adjusted under 35 U.S.C. 154(b) by 156 days.

(21) Appl. No.: 16/850,198

(22) Filed: Apr. 16, 2020

(65) Prior Publication Data

US 2020/0377524 A1 Dec. 3, 2020

(30) Foreign Application Priority Data

May 28, 2019 (EP) ..................... 19176868

(51) Int. Cl.
| | |
|---|---|
| *C08G 77/08* | (2006.01) |
| *C07F 7/08* | (2006.01) |
| *C08G 77/10* | (2006.01) |
| *C08G 77/38* | (2006.01) |
| *C08G 77/00* | (2006.01) |

(52) U.S. Cl.
CPC ............ *C07F 7/0832* (2013.01); *C08G 77/08* (2013.01); *C08G 77/10* (2013.01); *C08G 77/38* (2013.01); *C08G 77/70* (2013.01)

(58) Field of Classification Search
CPC ........ C08G 77/08; C08G 77/06; C08G 77/10; C08G 77/38
See application file for complete search history.

(56) References Cited

U.S. PATENT DOCUMENTS

| | | | |
|---|---|---|---|
| 4,066,680 A | 1/1978 | Lewis et al. | |
| 4,562,223 A * | 12/1985 | Steinberger | C08G 77/46 524/506 |
| 5,661,192 A * | 8/1997 | Giraud | C08K 3/26 521/93 |
| 6,063,887 A * | 5/2000 | Okawa | C08G 77/045 556/440 |
| 6,521,771 B2 | 2/2003 | Frommeyer et al. | |
| 6,659,162 B2 | 12/2003 | Frommeyer et al. | |
| 6,854,506 B2 | 2/2005 | Knott et al. | |
| 6,858,663 B2 | 2/2005 | Knott et al. | |
| 6,874,562 B2 | 4/2005 | Knott et al. | |
| 6,915,834 B2 | 7/2005 | Knott et al. | |
| 6,942,716 B2 | 9/2005 | Knott et al. | |
| 7,125,585 B2 | 10/2006 | Dudzik et al. | |
| 7,196,153 B2 | 3/2007 | Burkhart et al. | |
| 7,598,334 B2 | 10/2009 | Ferenz et al. | |
| 7,612,158 B2 | 11/2009 | Burkhart et al. | |
| 7,612,159 B2 | 11/2009 | Burkhart et al. | |
| 7,619,035 B2 | 11/2009 | Henning et al. | |
| 7,645,848 B2 | 1/2010 | Knott et al. | |
| 7,754,778 B2 | 7/2010 | Knott et al. | |
| 7,825,205 B2 | 11/2010 | Knott et al. | |
| 7,825,206 B2 | 11/2010 | Neumann et al. | |
| 7,825,209 B2 | 11/2010 | Knott et al. | |
| 7,838,603 B2 | 11/2010 | Schwab et al. | |
| 8,138,294 B2 | 3/2012 | Henning et al. | |
| 8,247,525 B2 | 8/2012 | Schubert et al. | |
| 8,268,939 B2 | 9/2012 | Ebbrecht et al. | |
| 8,283,422 B2 | 10/2012 | Schubert et al. | |
| 8,309,664 B2 | 11/2012 | Knott et al. | |
| 8,309,673 B2 | 11/2012 | Schubert et al. | |
| 8,324,325 B2 | 12/2012 | Knott et al. | |
| 8,334,355 B2 | 12/2012 | Henning et al. | |
| 8,349,907 B2 | 1/2013 | Henning et al. | |
| 8,420,748 B2 | 4/2013 | Henning et al. | |
| 8,450,514 B2 | 5/2013 | Schubert et al. | |
| 8,455,603 B2 | 6/2013 | Ferenz et al. | |
| 8,557,944 B2 | 10/2013 | Henning et al. | |
| 8,598,295 B2 | 12/2013 | Henning et al. | |
| 8,609,798 B2 | 12/2013 | Knott et al. | |
| 8,623,984 B2 | 1/2014 | Henning et al. | |
| 8,722,834 B2 | 5/2014 | Knott et al. | |
| 8,722,836 B2 | 5/2014 | Knott et al. | |

(Continued)

FOREIGN PATENT DOCUMENTS

| | | |
|---|---|---|
| CA | 1125780 | 6/1982 |
| EP | 3467006 A1 | 4/2019 |
| EP | 3 492 513 A1 | 6/2019 |
| EP | 3 611 214 A1 | 2/2020 |
| EP | 3 611 215 A1 | 2/2020 |
| EP | 3 611 216 A1 | 2/2020 |
| EP | 3 663 346 A1 | 6/2020 |
| SU | 224802 * | 1/1967 |
| WO | 02/060621 A2 | 8/2002 |
| WO | 02/094483 A2 | 11/2002 |

(Continued)

OTHER PUBLICATIONS

English language translation SU 224802, Jan. 1967.*
Knott et al., U.S. Appl. No. 17/145,558, filed Jan. 11, 2021.
Knott et al., U.S. Appl. No. 17/297,372, filed May 26, 2021.
Knott et al., U.S. Appl. No. 17/476,417, filed Sep. 15, 2021.
Fiedel et al., U.S. Appl. No. 16/648,345, filed Mar. 18, 2020.
Knott et al., U.S. Appl. No. 17/239,011, filed Apr. 23, 2021.
European Search Report dated Nov. 14, 2019 in EP 19176868.8 (6 pages).

(Continued)

*Primary Examiner* — Margaret G Moore
(74) *Attorney, Agent, or Firm* — Taylor English Duma LLP; Philip P. McCann

(57) ABSTRACT

Processes are described for purifying acidic, preferably superacidic, in particular trifluoromethanesulfonic acid-acidified, end-equilibrated acetoxysiloxanes, wherein the acidic, preferably superacidic, in particular trifluoromethanesulfonic acid-acidified, acetic anhydride-containing and optionally acetic acid-containing equilibrated, preferably end-equilibrated acetoxysiloxane, which is optionally dissolved in an inert solvent, is contacted with a base, the precipitate is filtered off thereafter and then the filtrate obtained is optionally purified by distillation.

9 Claims, No Drawings

(56) References Cited

U.S. PATENT DOCUMENTS

| | | | |
|---|---|---|---|
| 8,729,207 B2 | 5/2014 | Hartung et al. | |
| 8,772,423 B2 | 7/2014 | De Gans et al. | |
| 8,778,319 B2 | 7/2014 | Herrwerth et al. | |
| 8,779,079 B2 | 7/2014 | Henning et al. | |
| 8,796,198 B2 | 8/2014 | Henning et al. | |
| 8,802,744 B2 | 8/2014 | Knott et al. | |
| 8,841,400 B2 | 9/2014 | Henning et al. | |
| 8,921,437 B2 | 12/2014 | Knott et al. | |
| 8,946,369 B2 | 2/2015 | Henning et al. | |
| 8,957,009 B2 | 2/2015 | Schubert et al. | |
| 8,969,502 B2 | 3/2015 | Knott et al. | |
| 8,974,627 B2 | 3/2015 | Schubert et al. | |
| 8,993,706 B2 | 3/2015 | Schubert et al. | |
| 9,005,361 B2 | 4/2015 | Henning et al. | |
| 9,035,011 B2 | 5/2015 | Ferenz et al. | |
| 9,068,044 B2 | 6/2015 | Schubert et al. | |
| 9,115,335 B2 | 8/2015 | Trosin et al. | |
| 9,315,614 B2 | 4/2016 | Schubert et al. | |
| 9,334,354 B2 | 5/2016 | Ferenz et al. | |
| 9,353,225 B2 | 5/2016 | Knott et al. | |
| 9,481,695 B2 | 11/2016 | Knott et al. | |
| 9,540,500 B2 | 1/2017 | Ferenz et al. | |
| 9,695,202 B2 | 7/2017 | Henning et al. | |
| 9,738,797 B2 | 8/2017 | Niewski et al. | |
| 9,783,635 B2 | 10/2017 | Schubert et al. | |
| 9,783,656 B2 | 10/2017 | Lehmann et al. | |
| 9,845,391 B2 | 12/2017 | Lehmann et al. | |
| 9,868,699 B2 | 1/2018 | Nitz et al. | |
| 9,878,979 B2 | 1/2018 | Nitz et al. | |
| 9,896,541 B2 | 2/2018 | Fiedel et al. | |
| 9,975,909 B2 | 5/2018 | Schubert et al. | |
| 10,010,838 B2 | 7/2018 | Favresse et al. | |
| 10,087,278 B2 | 10/2018 | Fiedel et al. | |
| 10,093,605 B2 | 10/2018 | Bajus et al. | |
| 10,099,211 B2 | 10/2018 | Knott et al. | |
| 10,106,649 B2 | 10/2018 | Fiedel et al. | |
| 10,266,658 B2 | 4/2019 | Henning et al. | |
| 10,392,340 B2 | 8/2019 | Rittsteiger et al. | |
| 10,399,051 B2 | 9/2019 | Favresse et al. | |
| 10,399,998 B2 | 9/2019 | Knott et al. | |
| 10,407,592 B2 | 9/2019 | Amajjahe et al. | |
| 10,414,871 B2 | 9/2019 | Knott et al. | |
| 10,414,872 B2 | 9/2019 | Knott et al. | |
| 10,519,280 B2 | 12/2019 | Knott et al. | |
| 10,526,454 B2 | 1/2020 | Knott et al. | |
| 10,544,267 B2 | 1/2020 | Knott et al. | |
| 10,577,512 B2 | 3/2020 | Aitha et al. | |
| 10,836,867 B2 | 11/2020 | Knott | |
| 11,066,429 B2 | 7/2021 | Knott et al. | |
| 2002/0161158 A1 | 10/2002 | Burkhart et al. | |
| 2003/0013802 A1* | 1/2003 | Ahn | C08L 83/04 524/588 |
| 2007/0128143 A1 | 6/2007 | Gruning et al. | |
| 2008/0125503 A1 | 5/2008 | Henning et al. | |
| 2009/0137752 A1 | 5/2009 | Knott et al. | |
| 2010/0022435 A1 | 1/2010 | Henning et al. | |
| 2010/0029587 A1 | 2/2010 | Brueckner et al. | |
| 2010/0081781 A1 | 4/2010 | Schubert et al. | |
| 2011/0144269 A1 | 6/2011 | Kuppert et al. | |
| 2011/0230159 A1 | 9/2011 | Kuppert et al. | |
| 2011/0301254 A1 | 12/2011 | Knott et al. | |
| 2011/0306694 A1 | 12/2011 | Glos et al. | |
| 2012/0037036 A1 | 2/2012 | Veit et al. | |
| 2012/0068110 A1 | 3/2012 | Schubert et al. | |
| 2012/0190760 A1 | 7/2012 | Henning et al. | |
| 2012/0190762 A1 | 7/2012 | Hubel et al. | |
| 2012/0282210 A1 | 11/2012 | Henning et al. | |
| 2013/0041115 A1 | 2/2013 | Knott et al. | |
| 2013/0213267 A1 | 8/2013 | Fiedel et al. | |
| 2013/0259821 A1 | 10/2013 | Henning et al. | |
| 2013/0345318 A1 | 12/2013 | Schubert et al. | |
| 2014/0256844 A1 | 9/2014 | Henning et al. | |
| 2014/0309446 A1 | 10/2014 | Amajjahe et al. | |
| 2015/0004112 A1 | 1/2015 | Ritter et al. | |
| 2015/0004113 A1 | 1/2015 | Ritter et al. | |
| 2016/0130402 A1 | 5/2016 | Schubert et al. | |
| 2017/0198099 A1 | 7/2017 | Knott | |
| 2018/0016392 A1 | 1/2018 | Lobert et al. | |
| 2018/0155264 A1 | 6/2018 | Bajus et al. | |
| 2018/0258228 A1 | 9/2018 | Amajjahe et al. | |
| 2018/0305596 A1 | 10/2018 | Schubert et al. | |
| 2019/0031880 A1 | 1/2019 | Cavaleiro et al. | |
| 2019/0100625 A1 | 4/2019 | Knott et al. | |
| 2019/0106369 A1 | 4/2019 | Schubert et al. | |
| 2019/0106441 A1 | 4/2019 | Knott et al. | |
| 2019/0112502 A1 | 4/2019 | Sloot et al. | |
| 2019/0194488 A1 | 6/2019 | Favresse et al. | |
| 2019/0345101 A1 | 11/2019 | Cameretti et al. | |
| 2020/0055991 A1 | 2/2020 | Knott et al. | |
| 2020/0055992 A1 | 2/2020 | Knott et al. | |
| 2020/0216474 A1 | 7/2020 | Fiedel et al. | |
| 2020/0377526 A1 | 7/2020 | Knott et al. | |
| 2020/0339612 A1 | 10/2020 | Knott et al. | |
| 2020/0377525 A1 | 12/2020 | Knott et al. | |
| 2020/0377660 A1 | 12/2020 | Knott et al. | |
| 2020/0377665 A1 | 12/2020 | Knott et al. | |
| 2020/0377666 A1 | 12/2020 | Knott et al. | |
| 2020/0377686 A1 | 12/2020 | Knott et al. | |
| 2020/0385528 A1 | 12/2020 | Knott | |
| 2021/0130551 A1 | 5/2021 | Knott et al. | |
| 2021/0163687 A1 | 6/2021 | Knott et al. | |
| 2021/0171719 A1 | 6/2021 | Knott et al. | |
| 2021/0253780 A1 | 8/2021 | Wessely et al. | |
| 2021/0253799 A1 | 8/2021 | Knott et al. | |
| 2021/0301099 A1 | 9/2021 | Knott et al. | |
| 2021/0371598 A1 | 12/2021 | Knott et al. | |

FOREIGN PATENT DOCUMENTS

| | | |
|---|---|---|
| WO | 2008/074564 A2 | 6/2008 |
| WO | 2010/046181 A2 | 4/2010 |
| WO | 2018/118926 A2 | 10/2010 |
| WO | 2013/017365 A1 | 2/2013 |
| WO | 2013/050149 A1 | 4/2013 |
| WO | 2016/134538 A1 | 9/2016 |
| WO | 2018/001889 A1 | 1/2018 |
| WO | 2019/105608 A1 | 6/2019 |
| WO | 2019/192876 A1 | 10/2019 |
| WO | 2019/219446 A1 | 11/2019 |
| WO | 2019/219452 A1 | 11/2019 |

OTHER PUBLICATIONS

J. Pola et al., "Mechanism of Reversible Cleavage of Acetoxysilanes to Siloxanes and Acetanhydride," Collect. Czech. Chem. Commun. 1974, 39(5), 1169-1176 (8 pages).

* cited by examiner

PROCESS FOR PURIFYING ACETOXYSILOXANES

CROSS REFERENCE TO RELATED APPLICATIONS

This application is a 35 U.S.C. § 119 patent application which claims the benefit of European Application No. 19176868.8 filed May 28, 2019, which is incorporated herein by reference in its entirety.

FIELD

The invention relates to a process for purifying acetoxysiloxanes, to the purified acetoxysiloxanes obtained in this way, and also to the use thereof as starting materials for the preparation of SiOC-bonded polyethersiloxanes.

BACKGROUND

With reference to EP 3467006A1 and also the as-yet unpublished European patent applications with the application references EP 18172882.5, EP 18172876.7 and EP 17204277.2, which are concerned with the preparation of SiOC-bonded polyethersiloxanes, wherein trifluoromethanesulfonic acid-acidified, equilibrated acetoxysiloxanes of the linear or branched structural type are used as reactive intermediates, the teaching of the likewise unpublished European patent application EP 18189073.2 is geared towards a process for the preparation of trifluoromethanesulfonic acid-acidified, end-equilibrated acetoxy group-bearing siloxanes in which cyclic siloxanes, in particular comprising $D_4$ and/or $D_5$, and/or mixtures of cyclic branched siloxanes of the D/T type are reacted with acetic anhydride while using trifluoromethanesulfonic acid as catalyst and with addition of acetic acid.

The as-yet unpublished European patent applications having application references EP 17204277.2, EP 18189072.4 and EP 18189074.0 are geared towards processes for preparing acetoxy-modified siloxanes in which DT siloxane cycles and simple siloxane cycles containing only D units, respectively, are used as reactants.

EP 17204277.2 relates to a process for preparing SiOC-bonded polyethersiloxanes which are branched in the siloxane portion proceeding from mixtures of cyclic branched siloxanes of the D/T type, by, in a first step, reacting cyclic branched siloxanes of the D/T type with acetic anhydride, optionally in admixture with simple siloxane cycles, under acid catalysis to form acetoxy group-bearing branched siloxanes, and in a second step equilibrating the acetoxy-modified, branched siloxane with trifluoromethanesulfonic acid, and in a third step reacting the trifluoromethanesulfonic acid-acidified acetoxysiloxane with polyetherols optionally in the presence of bases and optionally in the presence of an inert solvent. The branched acetoxysiloxane obtained here contains, besides trifluoromethanesulfonic acid used, also about 0.10 mol of free acetic anhydride per mole of Si-bonded acetoxy function.

The as-yet unpublished European patent applications with application references EP 18189072.4 and EP 18189074.0, aiming not for branched but linear SiOC-bonded silicone polyether structures, to this end state that equilibrated α,ω-diacetoxypolydimethylsiloxanes are prepared via the reaction of siloxane cycles ($D_4/D_5$) with acetic anhydride in the presence of trifluoromethanesulfonic acid by contacting the reactants with 0.1 to 0.3 percent by mass of trifluoromethanesulfonic acid based on the entire reaction mass while mixing the reactants well and then heating to temperatures of 140 to 160° C. for a duration of 4 to 8 hours. Here, the initially slightly cloudy reaction mixture affords a clear, equilibrated trifluoromethanesulfonic acid-acidified α,ω-diacetoxypolydimethylsiloxane which, besides trifluoromethanesulfonic acid used, also contains 0.125 mol of free acetic anhydride based on the acetic anhydride equivalent chemically bonded in the α,ω-diacetoxypolydimethylsiloxane.

The as-yet unpublished European application document 18210035.4 describes (i) reaction systems for the preparation of acetoxy function-bearing siloxanes, comprising a) silanes and/or siloxanes bearing alkoxy groups and/or b) silanes and/or siloxanes bearing acetoxy groups, c) silanes and/or siloxanes bearing hydroxy groups, d) optionally simple siloxane cycles and/or DT cycles, e) a reaction medium, comprising acetic anhydride, perfluoroalkanesulfonic acid and preferably acetic acid, (ii) a process for preparing linear or branched, acetoxy function-bearing siloxanes and also the use of same for preparing polyethersiloxanes and is likewise incorporated in full into the disclosure content of this application.

According to the application identified above, it is for example possible to arrive at a branched siloxane bearing terminal acetoxy groups by reacting a branched silicone equilibrate (=pre-equilibrate) bearing terminal alkoxy groups as sole reactant with a reaction medium consisting of acetic anhydride, trifluoromethanesulfonic acid and acetic acid.

As an alternative, the as-yet unpublished European patent application 18210035.4 states within the context of a further preferred embodiment that it is also possible for all reactants and/or combinations of these to be initially charged from the start directly with the reaction medium while mixing well and then for these to be reacted by means of heating and removing volatile byproducts, from which a branched siloxane bearing terminal acetoxy groups then directly results.

According to the teaching of European patent application 18210035.4, depending on the target structure of the siloxane bearing terminal acetoxy groups, it may be advantageous to choose a sequenced procedure, that is to say using a pre-equilibrate, or else a concerted procedure (initially charging all reactants and/or combinations of these from the outset).

In operational practice, it would be desirable to be able to determine the content of active silicon-bonded groups rapidly by wet chemical means independently of expensive and at times time-consuming apparatus-based analysis (such as e.g. $^1H$, $^{13}C$ and $^{29}Si$ NMR spectroscopy) in order to have a reliable calculation basis for the stoichiometric calculation of production batches. The presence of trifluoromethanesulfonic acid and acetic anhydride in the reactive acetoxysiloxane precursors obtained as per EP 17204277.2 or EP 18189072.4, EP 18189074.0 and EP 18210035.4, or the presence of trifluoromethanesulfonic acid, acetic anhydride and acetic acid as per EP 18189073.2, makes titrimetric determination of the content of the acetoxy groups bonded to the silicon considerably more difficult, since this always has to be determined alongside the acetic anhydride present in the matrix or alongside acetic anhydride and acetic acid. Double or multiple titrations are therefore unavoidable for the detection of individual acetoxy species within the complex substance matrix.

A reliable calculation basis for the stoichiometric calculation of production batches, in particular with respect to the preparation of SiOC-bonded, linear polydimethylsiloxane-polyoxyalkylene block copolymers having repeating (AB)

units, is of particular significance. The likewise unpublished European patent application having the application reference EP 18189072.4, which relates to a process for preparing these polydimethylsiloxane-polyoxyalkylene block copolymers, states that the molar ratio of α,ω-diacetoxysiloxanes to polyether diols should preferably be selected in the range from 0.90 to 1.10, preferably in the range 0.95 to 1.05, particularly preferably in the range 0.99 to 1.01, since the degree of polymerization achievable is linked directly to the maintenance of a virtually perfect stoichiometry of the reactants.

A further aspect stated by EP 17204277.2 with respect to the further processing of the trifluoromethanesulfonic acid-acidified branched acetoxysiloxanes still containing acetic anhydride is that the neutralization, performed at a later point in time, of the acid present in the reaction system, in particular after the thermal removal of acetic acid formed, residual acetic anhydride and any solvent used, leads to partial esterification of the polyetherol present in the system with acetic acid. Experience has shown that the longer duration of action of the trifluoromethanesulfonic acid present in the system also frequently produces more intensely colored products. (Example 3, ibid.).

Distillative removal of the acetic acid affords a preparation consisting of an SiOC-bonded, branched silicone polyether along with a polyetherol and a polyetherol end-capped with acetyl groups. Such preparations having reduced hydroxyl functionality are of interest for specific applications, but not for the spectrum of possible applications.

SUMMARY

Surprisingly, it has now been found that it is possible to simply remove the contents of both superacid, in particular trifluoromethanesulfonic acid, and acetic anhydride present in the branched (cf. EP 17204277.2) and the linear acetoxysiloxanes (cf. EP 18189072.4 and EP 18189074.0), or else trifluoromethanesulfonic acid, acetic anhydride and acetic acid as per EP 18189073.2, and thus to arrive at purified acetoxysiloxanes which both reduce the effort for titrimetric determination and also the effort for avoiding acetylated polyetherols.

In addition, it has now surprisingly been found that the acetoxysiloxanes purified according to the invention can be easily freed of free simple siloxane cycles (comprising $D_4/D_5/D_6$) by distillation, preferably with application of an auxiliary vacuum, without leading to formation of undesirable impurities and in particular without leading to the occurrence of what is known as a backbiting reaction either, which otherwise produces cyclic siloxanes again. The possibility discovered here according to the invention of removing cycles at the stage of the reactive siloxane (acetoxysiloxane) is of great industrial significance, since the market increasingly demands VOC-free (volatile organic compound), organomodified silicone additives but the thermal removal of siloxane cycles from the final product is made difficult by the fact that the cycles removed by distillation at the stage of the organomodified siloxane always contain varying proportions of organic entrained material, so that these can be reused afterwards only to a limited extent for the synthesis of siloxane parent molecules. In addition, the thermal stress on the SiOC-structured polyethersiloxane always harbors the increased risk of undesirable product discolorations.

The dilemma which arises from the requirements for product quality on the one hand and freedom from cycles on the other hand has been discussed extensively in WO 2013/050149A1, which is geared towards a solvent-assisted stripping process for removing cyclic silicones from silicone-based products and in this case in particular teaches the use of glyoxal acetals such as tetraethoxy- and tetramethoxyethane as azeotrope-forming solvents for the distillative removal of cyclic siloxanes from amino-functional siloxanes.

DETAILED DESCRIPTION

According to the invention, the acetoxysiloxanes preferably obtained according to EP 17204277.2 or EP 18189072.4, EP 18189074.0 and 18210035.4 are preferably purified in such a way that either ammonia is introduced into the, in particular trifluoromethanesulfonic acid-acidified, acetic anhydride-containing and optionally acetic acid-containing equilibrated, preferably end-equilibrated acetoxysiloxane, which is optionally dissolved in an inert solvent, the precipitate, in particular comprising ammonium triflate, ammonium acetate and acetamide, is filtered off, and then the filtrate obtained is optionally subjected to distillation in order to remove the siloxane cycles ($D_4/D_5/D_6$) and also any inert solvent used, or the, in particular trifluoromethanesulfonic acid-acidified, acetic anhydride-containing and optionally acetic acid-containing equilibrated, preferably end-equilibrated acetoxysiloxane, which is optionally dissolved in an inert solvent, is contacted with a solid and/or liquid base, preferably with an acetate salt, the precipitate, in particular triflate precipitate, is filtered off, and then the filtrate obtained is optionally subjected to distillation in order to remove the acetic acid, the acetic anhydride, the siloxane cycles ($D_4/D_5/D_6$) and also any inert solvent used.

Against this background, the invention provides a process for purifying acidic, preferably superacidic, in particular trifluoromethanesulfonic acid-acidified, equilibrated, preferably end-equilibrated, acetic anhydride-containing acetoxysiloxanes, in which (a) the acidic, preferably superacidic, in particular trifluoromethanesulfonic acid-acidified, acetic anhydride-containing and optionally acetic acid-containing equilibrated, preferably end-equilibrated acetoxysiloxane, which is optionally dissolved in an inert solvent, is contacted with a base, (b) the precipitate is filtered off and (c) the filtrate obtained is optionally purified by distillation.

What is meant by the term "end-equilibrated" is that the equilibrium established at a temperature of 23° C. and a pressure of 1013.25 hPa has been attained. The indicator used for the attainment of the equilibrium may be the total cycles content determined by gas chromatography and defined as the sum total of the $D_4$, $D_5$ and $D_6$ contents, based on the siloxane matrix and ascertained after derivatization of the α,ω-diacetoxypolydimethylsiloxanes to give the corresponding α,ω-diisopropoxypolydimethylsiloxanes or after the derivatization of the branched acetoxysiloxanes to give the corresponding branched isopropoxysiloxanes. The use of acetic acid makes it possible here without difficulty to undershoot otherwise customary equilibrium proportions of about 13 percent by weight of total cycles content for the linear α,ω-diacetoxypolydimethylsiloxanes and of about 8 percent by weight of total cycles content for the branched acetoxysiloxanes. Accordingly, it corresponds to a preferred embodiment when equilibrium proportions of the total cycles content of less than 13, preferably less than 12 percent by weight for the linear α,ω-diacetoxypolydimethylsiloxanes and equilibrium proportions of the total cycles content of less than 8, preferably less than 7 percent by weight for the branched acetoxysiloxanes are undershot. The derivatization to give the α,ω-diisopropoxypolydimethylsiloxanes or the branched isopropoxysiloxanes is chosen here deliberately in order to prevent a thermally induced retrocleavage reaction of the α,ω-diacetoxypolydimethylsiloxanes or of the branched acetoxysiloxanes which may take place under the conditions of analysis by gas chromatography (regarding the retrocleavage reaction, see inter alia J. Pola et al., Collect. Czech. Chem. Commun. 1974, 39(5), 1169-1176 and also W. Simmler, Houben-Weyl, Methods of Organic Chemistry, Vol. VI/2, 4th Edition, O-Metal Derivates of Organic Hydroxy Compounds p. 162 ff.).

In a preferred embodiment of the invention, in step (a) the base introduced is ammonia, thereafter the precipitate, in particular comprising ammonium triflate, ammonium acetate and acetamide, is filtered off, and then the filtrate obtained is optionally subjected to distillation in order to remove the siloxane cycles ($D_4/D_5/D_6$) and also any inert solvent used, wherein the treatment of the siloxane with ammonia is preferably conducted in the temperature range from 0° C. to 50° C., preferably between 15° C. to 35° C.

In another preferred embodiment of the invention, in step (a) contact is made with a solid and/or liquid base, and thereafter the precipitate, in particular always comprising triflate salts and acetates and also possibly acetamides and possibly the solid base used in excess, is filtered off, and then the filtrate obtained is optionally subjected to distillation in order to remove any acetic acid still present and also any acetic anhydride still present and the siloxane cycles ($D_4/D_5/D_6$) and also any inert solvent used, wherein the solid and/or liquid base to be used comprises a hydrogencarbonate and/or carbonate of the alkali or alkaline earth metals, in this case possibly also in the form of a hydrate, and/or an organic amine base, comprising primary and/or secondary amines and/or tertiary amines, in particular also hydroxyalkyl group-bearing amines such as diisopropanolamine and/or triisopropanolamine or particularly preferably an acetate salt, wherein the treatment of the siloxane with a solid and/or liquid base is preferably conducted in the temperature range from 0° C. to 140° C., preferably in the temperature range from 20° C. to 110° C.

Astonishingly, it has been found that the salt body separated off after the introduction of ammonia, in particular mixed ammonium triflate/ammonium acetate/acetamide salt body, depending on the selected precipitation conditions is obtained as a coarse salt and often also in the form of a well crystallized spherical salt. This morphological aspect is of considerable importance for the industrial implementation of the invention in that it significantly facilitates separation by filtration from the liquid (low hydraulic pressure drop within the filtercake) and at the same time minimizes the losses of acetoxysiloxane that can be observed as a result of adhesion to the salt body.

When using ammonia, the minimum amount of ammonia to be used is proportioned in particular to the cumulative amount of acid, in particular comprising trifluoromethanesulfonic acid and optionally acetic acid, and acetic anhydride present in the end-equilibrated acetoxysiloxane. However, for practical considerations for the purpose of ensuring complete precipitation, excesses of ammonia based on the total amount of reactants are advantageously selected, with the ammonia excess of course not being excessively proportioned for economic and waste disposal aspects. According to the invention, preference is given to using a one- to 10-fold stoichiometric excess, particularly preferably a one- to 5-fold stoichiometric excess of ammonia.

Larger excesses of ammonia, in particular combined with long reaction times and temperatures, should preferably be avoided since the inventors have in this case seen in the $^{29}$Si NMR spectrum the degradation of very short acetoxy group-bearing siloxanes with elongation of the average siloxane chain length, reliably demonstrable for example by the integration ratio of acetoxy end groups to D units.

For instance, using by way of example $^{29}$Si NMR spectroscopy in samples of end-equilibrated, trifluoromethanesulfonic acid-acidified α,ω-diacetoxypolydimethylsiloxane treated at 22° C. with relatively large excesses of ammonia, depending on the contact time and according to the reactivity series, it is possible to observe initially the disappearance of silanic acetoxy molecules, such as for example diacetoxydimethylsilane (N=1), then of α,ω-diacetoxytetramethyldisiloxane (N=2) and then the degradation of α,ω-diacetoxyhexamethyltrisiloxane (N=3) and then further still the degradation of the higher oligomers.

According to the invention, it is preferable in the embodiment variant which envisages the introduction of ammonia to conduct the purification of the acidic, preferably trifluoromethanesulfonic acid-acidified, acetic anhydride-containing and optionally acetic acid-containing, equilibrated, preferably end-equilibrated acetoxysiloxane with ammonia in the temperature range from 0° C. to 50° C., preferably between 15° C. to 35° C.

The acetoxysiloxane obtained after filtering off the mixed salt is a reactive silicone intermediate which can be stored stably in the exclusion of moisture and which is immediately suitable for example for further processing into SiOC-bonded polyethersiloxanes.

The linear or branched acetoxysiloxanes, obtained in accordance with the invention according to the embodiment variant which envisages the introduction of ammonia and freed of acid and acetic anhydride, have improved storage stability compared to the untreated starting materials and, moreover, the branched acetoxysiloxanes in particular display only a low tendency to gelation on contact with water. This last-mentioned aspect of the gain in stability achieved according to the invention can be experimentally tested very simply, by applying small volumes (for example approx. 1 ml) of untreated/inventively treated branched acetoxysiloxane to black Bakelite lids and then admixing same with a few millilitres of distilled water. In a matter of minutes, the untreated branched acetoxysiloxane undergoes complete gelation to form a white silicone network, whereas the timeline for gelation to begin for the branched acetoxysiloxane treated according to the invention and used in the comparative experiment is markedly extended (more than 24 hours).

Addressing the previously touched-upon aspect of freedom from VOCs, it is alternatively possible, however, to also subject the acetoxysiloxane purified according to the invention to a further downstream distillation in order to—as already stated—lower the content of simple siloxane cycles ($D_4/D_5/D_6$) and also to remove any inert solvent used.

According to the invention, solvents regarded to be inert for both embodiment variants (introduction of ammonia and use of liquid or solid bases) are preferably those which do not have a tendency toward reaction with the components present in the acetoxysiloxane matrix, in particular alkanes, cycloalkanes, aromatics and alkylaromatics, here in particular toluene. With respect to avoidable separation effort, the solvent-free purification of acetoxysiloxanes is however particularly preferred according to the invention.

In contrast to the original, in particular trifluoromethanesulfonic acid-acidified, acetic anhydride-containing and optionally acetic acid-containing acetoxysiloxanes, the vinegar smell of the acetoxysiloxanes purified according to the invention is reduced by an extremely marked degree.

The solid and/or liquid base to be used in accordance with the invention preferably according to the other embodiment variant is preferably a hydrogencarbonate and/or carbonate of the alkali or alkaline earth metals, in this case possibly also in the form of a hydrate, and/or an organic amine base, comprising primary, secondary and tertiary amines, among these in particular also those which for example bear a hydroxyalkyl function such as for example diisopropanolamine or triisopropanolamine or more preferably an acetate salt.

According to a preferred embodiment of the invention, the treatment of the trifluoromethanesulfonic acid-acidified, equilibrated, preferably end-equilibrated, acetoxy group-bearing siloxane with a solid and/or liquid base is conducted in the temperature range from 0° C. to 140° C., preferably in a temperature range from 20° C. to 110° C.

The ideal temperature when adding a solid and/or liquid base is naturally also affected by the physicochemical properties of the solid and/or liquid base itself. In the case of the use of the potassium acetate which is to be used with particular preference according to the invention, it is advisable to select an addition temperature for the base of above 90° C., better at 100° C., in order to ensure good solubility and hence effectiveness of the potassium acetate in the trifluoromethanesulfonic acid-acidified, equilibrated, preferably end-equilibrated, acetoxy group-bearing siloxane (example 5). Here, a few exploratory experiments are sufficient for those skilled in the art to be able to determine the addition temperature that is optimal in each case.

In accordance with the invention, preference is given, according to the embodiment variant which envisages the use of a solid and/or liquid base, to contacting the trifluoromethanesulfonic acid-acidified, acetic anhydride-containing and optionally acetic acid-containing equilibrated, preferably end-equilibrated acetoxysiloxane, which is optionally dissolved in an inert solvent, with an acetate salt.

The minimum amount of solid and/or liquid base, preferably an acetate salt, to be used in accordance with the invention with preference according to this embodiment variant is proportioned to the amount of acid, in particular trifluoromethanesulfonic acid, present in the equilibrated, preferably end-equilibrated acetoxysiloxane. However, for practical considerations for the purpose of ensuring complete precipitation, excesses of solid and/or liquid base, preferably an acetate salt, based on the acid equivalent, in particular trifluoromethanesulfonic acid equivalent, are always selected. According to the invention, preference is given to using a one- to 10-fold stoichiometric excess, particularly preferably a one- to 5-fold stoichiometric excess of solid and/or liquid base, preferably an acetate salt, based on the acid equivalent, in particular trifluoromethanesulfonic acid equivalent.

According to the invention, the acetate salts used are preferably the acetates of sodium, of potassium, of magnesium, of aluminium. Potassium acetate is particularly preferred.

After introducing the solid and/or liquid base, preferably an acetate salt, a triflate precipitate forms which can be removed by simple filtration. The acetoxysiloxane obtained after filtering is a reactive siloxane intermediate which can be stored stably in the exclusion of moisture and which either is immediately suitable for example for the further processing into SiOC-bonded polyethersiloxanes or else can optionally be subjected to distillation to remove the acetic acid, the acetic anhydride, the siloxane cycles ($D_4/D_5/D_6$) and also any inert solvent used.

All acetoxysiloxanes purified according to the invention can be easily further processed by reaction with polyetherols or polyether diols, respectively, to give the corresponding linear or branched SiOC-bond bearing polyethersiloxanes (ex. 4, 7 and 8).

EXAMPLES

The examples which follow serve merely to elucidate this invention to those skilled in the art and do not constitute any limitation of the claimed process whatsoever. The inventive determination of the water contents is in principle performed by the Karl Fischer method based on DIN 51777, DGF E-III 10 and DGF C-III 13a. $^{29}$Si NMR spectroscopy was used for reaction monitoring in all examples.

In the context of the present invention the $^{29}$Si NMR samples are analysed at a measurement frequency of 79.49 MHz in a Bruker Avance III spectrometer equipped with a 287430 sample head with gap width of 10 mm, dissolved at 22° C. in $CDCl_3$ and against a tetramethylsilane (TMS) external standard [$\delta(^{29}Si)$=0.0 ppm].

The gas chromatograms are recorded on a GC instrument of the GC 7890B type from Agilent Technologies, equipped with a column of the HP-1 type; 30 m×0.32 mm ID×0.25 μm dF (Agilent Technologies no. 19091Z-413E) and hydrogen as carrier gas, with the following parameters:

Detector: FID; 310° C.
Injector: split; 290° C.
Mode: constant flow, 2 ml/min
Temperature programme: 60° C. at 8° C./min –150° C. at 40° C./min–300° C. 10 min.

The indicator used for the attainment of the equilibrium is the total cycles content determined by gas chromatography and defined as the sum total of the $D_4$, $D_5$ and $D_6$ contents, based on the siloxane matrix and ascertained after derivatization of the α,ω-acetoxypolydimethylsiloxanes or of the branched acetoxysiloxanes to give the corresponding α,ω-diisopropoxypolydimethylsiloxanes or to give the corresponding branched isopropoxysiloxanes. The derivatization to give the isopropoxysiloxanes is chosen here deliberately in order to prevent a thermally induced retrocleavage reaction of the acetoxysiloxanes which may take place under the conditions of analysis by gas chromatography (regarding the retrocleavage reaction, see inter alia J. Pola et al., Collect. Czech. Chem. Commun. 1974, 39(5), 1169-1176 and also W. Simmler, Houben-Weyl, Methods of Organic Chemistry, Vol. VI/2, 4th Edition, O-Metal Derivates of Organic Hydroxy Compounds p. 162 ff.).

The polyetherols used have water contents of about 0.2% by mass and are used without further pre-drying. Toluene and, respectively, alkylbenzene ($C_{10}$-$C_{13}$) used have a water content of 0.03% by mass and are likewise used without pre-drying.

The OH number of the polyetherols is determined according to DGF C-V 17 a (53) or according to Ph. Eur. 2.5.3 Method A, wherein the hydroxyl groups of the sample to be analysed are firstly acetylated with acetic anhydride in the presence of pyridine and then within the scope of a differential titration (blank sample, accounting for acetic anhydride excess) the liberated acetic acid is titrated as the consumption of KOH in mg per gram of polyether diol.

Example 1 (noninventive)

Preparation of a Cyclic Branched Siloxane Having a Target D/T Ratio of 6:1

In a 101 four-neck round-bottom flask with a precision glass stirrer and a reflux condenser on top, 783 g (4.39 mol) of methyltriethoxysilane together with 978.7 g (2.64 mol) of decamethylcyclopentasiloxane are heated to 60° C. with stirring, admixed with 2.98 g of trifluoromethanesulfonic acid and the mixture is equilibrated for 4 hours. 237 g of water and 59.3 g of ethanol are then added and the mixture is heated to reflux temperature for a further 2 hours. 159.0 g of water and 978.8 g (2.64 mol) of decamethylcyclopentasiloxane ($D_5$) are added and the reflux condenser is exchanged for a distillation bridge and the constituents that are volatile up to 90° C. are distilled off within the next hour. 3000 ml of toluene are then added to the reaction mixture and the water still present in the system is removed by distillation up to a bottom temperature of 100° C. at the water separator. The reaction mixture is allowed to cool to approx. 60° C., the acid is neutralized by addition of 60.0 g of solid sodium hydrogencarbonate, and the mixture is then stirred for a further 30 minutes to achieve complete neutralization. After cooling to 25° C., the salts are removed with the aid of a fluted filter.

At 70° C. and with an auxiliary vacuum of <1 mbar applied, the toluene used as solvent is distilled off. The distillation bottoms are a colorless, mobile liquid, the $^{29}$Si NMR spectrum of which shows a D/T ratio of 6.18:1 (target 6.0:1). Based on the sum of the Si units detected by spectroscopy, the D and T units bearing Si-alkoxy and/or SiOH groups have a proportion of 0.52 mole percent. The gas chromatography analysis of the liquid also shows a proportion of about 15 percent by weight of simple siloxane cycles in the form of $D_4$, $D_5$ and $D_6$. The GPC has a broad molar mass distribution, characterized by Mw=55 258 g/mol; Mn: 1693 g/mol and Mw/Mn=32.63.

Example 2 (noninventive)

Preparation of an acetoxy-terminated, branched siloxane with 1.5% acetic acid addition A 1000 ml four-neck flask with a precision glass stirrer, an internal thermometer and a reflux condenser on top is initially charged with 49.9 g (0.489 mol) of acetic anhydride together with 268.1 g of the DT cycles prepared in example 1 (D/T ratio according to $^{29}$Si NMR spectrum=6.18:1, M=525.42 g/mol and a proportion of SiOH/SiOEt groups of 0.52 mol %) and 188.5 g of decamethylcyclopentasiloxane ($D_5$) while stirring and this mixture is admixed with 1.03 g (0.56 ml) of trifluoromethanesulfonic acid (0.2% by mass based on the total mixture) and 7.6 g of acetic acid (1.5% by mass based on the mass of the reactants) and swiftly heated to 150° C. The initially slightly cloudy reaction mixture is left at this temperature for 6 hours with continued stirring.

After cooling of the mixture, a colorless, clear, mobile liquid is isolated, the $^{29}$Si NMR spectrum of which substantiates the presence of Si-acetoxy groups in a yield of about 88.2%, based on the acetic anhydride used, and the complete disappearance of spectroscopically detectable proportions of Si-alkoxy and SiOH groups.

Conversion of the Branched Acetoxysiloxane into the Corresponding Branched Isopropoxysiloxane for Analytical Characterization Immediately after the synthesis, in a 100 ml four-neck round-bottom flask equipped with a precision glass stirrer, an internal thermometer, and a reflux condenser on top, 25.0 g of this trifluoromethanesulfonic acid-acidified, equilibrated branched acetoxysiloxane are mixed together with 5.8 g of a molecular sieve-dried isopropanol at 22° C. with stirring. Gaseous ammonia ($NH_3$) is then introduced to the reaction mixture until alkaline reaction (moist universal indicator paper) and the mixture is then stirred at this temperature for a further 45 minutes. The precipitated salts are removed using a fluted filter. A colorless, clear liquid is isolated, the accompanying $^{29}$Si NMR spectrum of which substantiates the quantitative conversion of the branched acetoxysiloxane into a branched isopropoxysiloxane.

An aliquot of this branched isopropoxysiloxane is withdrawn and analysed by gas chromatography. The gas chromatogram shows the following contents (reported in percent by mass):

| $D_4$ | $D_5$ | $D_6$ | Sum total ($D_4$-$D_6$) | Isopropanol content |
|---|---|---|---|---|
| 2.5% | 1.6% | 0.6% | 4.7% | 9.7% |

Taking the isopropanol excess into account, the contents of siloxane cycles ($D_4$, $D_5$ and $D_6$) are calculated here solely based on the siloxane proportion.

Example 3 (inventive)

Purification of the Branched Acetoxysiloxane Obtained in Example 2

A 500 ml four-neck round-bottom flask equipped with a precision glass stirrer, a reflux condenser on top, an internal thermometer and a gas inlet tube is initially charged with 150 g of the trifluoromethanesulfonic acid-acidified branched acetoxysiloxane obtained in example 2 at 23° C. with stirring. Approximately 31 of gaseous ammonia (rotameter) are introduced over the course of 30 minutes. After just 5 minutes, the stirred liquid phase becomes markedly cloudy as a result of the onset of salt precipitation.

After the introduction of ammonia has ended, the liquid is freed from precipitate using a filter press (Seitz K 300 filter disc). The salt cake on the filter disc consists of coarse, pale brownish crystals. The filtrate isolated is a clear, colorless liquid, which is subjected to an oil pump vacuum of about 1 mbar on a rotary evaporator for approx. 5 minutes to remove any ammonia still dissolved therein.

A $^{29}$Si NMR spectrum confirms the structural obtainment of the branched, acetoxy group-bearing siloxane. In contrast to the untreated starting material, quite considerably increased hydrolysis stability results, which is for example shown by the fact that the purified material has at the most a very minor tendency toward gelation on contact with water. In a simple manual experiment, approx. 1 ml of the branched acetoxysiloxane purified according to the invention can be contacted with a few drops of water on a black Bakelite lid. The gelation of the unpurified material which otherwise sets in within a matter of minutes (formation of a solid, white gel layer), does not occur here.

Example 4 (inventive)

Conversion of the Purified Branched Acetoxysiloxane Obtained in Example 3 to Give a Polyethersiloxane (Flexible Polyurethane Foam Stabilizer)

A 500 ml four-neck flask with a precision glass stirrer, an internal thermometer, and a reflux condenser on top is initially charged with 169.4 g of a butanol-started polyetherol mixture (propylene oxide proportion of 47 percent by mass, ethylene oxide proportion of 53 percent by mass) having an average molar mass of 2200 g/mol (individual molar masses determined according to respective OH number) in 200 ml of toluene with stirring and this mixture is admixed with 40 g of the purified, branched acetoxysiloxane prepared in example 3.

The reaction mixture is heated to 50° C. for 30 minutes with continued stirring. Then, over the course of a further 30 minutes, firstly the amount of gaseous ammonia required for neutralization is introduced into the reaction matrix. Over the course of a further 45 minutes, an additional gentle ammonia stream is introduced so that the reaction mixture clearly shows alkaline reaction (moist indicator paper). The precipitated salts are removed from the toluenic phase via a double-fluted filter.

The crude product is freed of toluene by distillation on a rotary evaporator at a bottom temperature of 70° C. and an applied auxiliary vacuum of 1 mbar. The virtually colorless preparation of an SiOC-bonded branched polyethersiloxane is isolated, the target structure of which is confirmed by a $^{29}$Si NMR spectrum.

Example 5 (inventive)

Purification of the Branched Acetoxysiloxane Obtained in Example 2

A 500 ml four-neck round-bottom flask equipped with a precision glass stirrer, a reflux condenser on top, an internal thermometer and a gas inlet tube is initially charged with 150 g of the trifluoromethanesulfonic acid-acidified branched acetoxysiloxane obtained in example 2 at 100° C. with stirring. 0.3 g (0.004 mol) of solid potassium acetate is added. The mixture is left to stir at 100° C. for a further 30 minutes and thereafter is allowed to cool to a temperature of approx. 35° C.

The liquid is then freed of precipitate using a filter press (Seitz K 300 filter disc). The salt cake on the filter disc consists of coarse, virtually colorless crystals. The filtrate isolated is a colorless, clear liquid.

A $^{29}$Si NMR spectrum confirms the structural obtainment of the branched, acetoxy group-bearing siloxane. In contrast to the untreated starting material, markedly increased hydrolysis stability results, which is for example shown by the fact that the purified material has only a minor tendency toward gelation on contact with water. In a simple manual experiment, approx. 1 ml of the branched acetoxysiloxane purified according to the invention can be contacted with a few drops of water on a black Bakelite lid. The gelation of the unpurified material which otherwise sets in within a matter of minutes (formation of a solid, white gel layer), does not occur here.

Distillation of the Filtrate to Remove Acetic Acid, Acetic Anhydride and Siloxane Cycles The one-hour distillation was effected on a rotary evaporator at 130° C. with an applied auxiliary vacuum of approx. 1 mbar. The distillation residue is used further.

Conversion of the Branched Acetoxysiloxane into the Corresponding Branched Isopropoxysiloxane for Analytical Characterization In a 100 ml four-neck round-bottom flask equipped with a precision glass stirrer, an internal thermometer, and a reflux condenser on top, 25.0 g of this distillation-purified branched acetoxysiloxane are mixed together with 5.8 g of a molecular sieve-dried isopropanol at 22° C. with stirring. Gaseous ammonia (NH$_3$) is then introduced to the reaction mixture until alkaline reaction (moist universal indicator paper) and the mixture is then stirred at this temperature for a further 45 minutes. The precipitated salts are removed using a fluted filter. A colorless, clear liquid is isolated, the accompanying $^{19}$Si NMR spectrum of which substantiates the quantitative conversion of the branched acetoxysiloxane into a branched isopropoxysiloxane.

An aliquot of this branched isopropoxysiloxane is withdrawn and analysed by gas chromatography. The gas chromatogram shows the following contents (reported in percent by mass):

| $D_4$ | $D_5$ | $D_6$ | Sum total ($D_4$-$D_6$) | Isopropanol content |
|---|---|---|---|---|
| 0.28% | 0.11% | 0.05% | 0.44% | 10.1% |

Taking the isopropanol excess into account, the contents of siloxane cycles ($D_4$, $D_5$ and $D_6$) are calculated here solely based on the siloxane proportion.

Example 6

Conversion of the distilled branched acetoxysiloxane obtained in example 5 to give a polyethersiloxane (flexible polyurethane foam stabilizer)

A 500 ml four-neck flask with a precision glass stirrer, an internal thermometer, and a reflux condenser on top is initially charged with 169.4 g of a butanol-started polyetherol mixture (propylene oxide proportion of 47 percent by mass, ethylene oxide proportion of 53 percent by mass) having an average molar mass of 2200 g/mol (individual molar masses determined according to respective OH number) in 200 ml of toluene with stirring and this mixture is admixed with 40 g of the branched acetoxysiloxane distilled in example 5.

The reaction mixture is heated to 50° C. for 30 minutes with continued stirring. Then, over the course of a further 30 minutes, firstly the amount of gaseous ammonia required for neutralization is introduced into the reaction matrix. Over the course of a further 45 minutes, an additional gentle ammonia stream is introduced so that the reaction mixture clearly shows alkaline reaction (moist indicator paper).

The precipitated salts are removed from the toluenic phase via a double-fluted filter. The crude product is freed of toluene by distillation on a rotary evaporator at a bottom temperature of 70° C. and an applied auxiliary vacuum of 1 mbar.

A virtually colorless, SiOC-bonded branched polyethersiloxane is isolated, the target structure of which is confirmed by a $^{29}$Si NMR spectrum and the content of siloxane cycles ($D_4$, $D_5$ and $D_6$) of which, determined by gas chromatography, is less than 0.08 percent by mass.

Example 7 (noninventive)

Preparation of An Acetoxy-Terminated, Linear Polydimethylsiloxane With 1.5% Acetic Acid Addition A 1000 ml four-neck flask with a precision glass stirrer, an internal thermometer, and a reflux condenser on top is initially charged with 77.3 g (0.757 mol) of acetic anhydride together with 732.8 g (1.98 mol) of decamethylcyclopentasiloxane ($D_5$) and 12.2 g of acetic acid (1.5% by weight based on the total mass of the reactants) while stirring and this mixture is admixed with 1.62 g (0.88 ml) of trifluoromethanesulfonic acid (0.2 percent by mass based on the total mixture) and swiftly heated to 150° C. The initially slightly cloudy reaction mixture is left at this temperature for 6 hours with continued stirring.

After cooling of the mixture, a colorless, clear, mobile liquid is isolated, the $^{29}$Si NMR spectrum of which substantiates the presence of Si-acetoxy groups in a yield of about 93% based on acetic anhydride used corresponding to an α,ω-diacetoxypolydimethylsiloxane having an average total chain length of about 14.

Conversion of the α,ω-Diacetoxypolydimethylsiloxane into the Corresponding α,ω-Diisopropoxypolydimethylsiloxane for Analytical Characterization Immediately after the synthesis, in a 250 ml four-neck round-bottom flask equipped with a precision glass stirrer, an internal thermometer, and a reflux condenser on top, 50.0 g of this trifluoromethanesulfonic acid-acidified, equilibrated α,ω-diacetoxypolydimethylsiloxane are mixed together with 11.3 g of a molecular sieve-dried isopropanol at 22° C. with stirring. Gaseous ammonia (NH$_3$) is then introduced to the reaction mixture until alkaline reaction (moist universal indicator paper) and the mixture is then stirred at this temperature for a further 45 minutes. The precipitated salts are removed using a fluted filter. A colorless, clear liquid is isolated, the accompanying $^{29}$Si NMR spectrum of which substantiates the quantitative conversion of the α,ω-diacetoxypolydimethylsiloxane into an α,ω-diisopropoxypolydimethylsiloxane. An aliquot of this α,ω-diisopropoxypolydimethylsiloxane is withdrawn and analysed by gas chromatography. The gas chromatogram shows the following contents (reported in percent by mass):

| $D_4$ | $D_5$ | $D_6$ | Sum total ($D_4$-$D_6$) | Isopropanol content |
|---|---|---|---|---|
| 4.94% | 4.04% | 1.07% | 10.05% | 11.00% |

Taking the isopropanol excess into account, the contents of siloxane cycles ($D_4$, $D_5$ and $D_6$) are calculated here solely based on the siloxane proportion.

Example 8 (inventive)

Purification of the Linear Acetoxysiloxane Obtained in Example 7

A 500 ml four-neck round-bottom flask equipped with a precision glass stirrer, a reflux condenser on top, an internal thermometer and a gas inlet tube is initially charged with 310.4 g of the trifluoromethanesulfonic acid-acidified linear acetoxysiloxane obtained in example 5 at 23° C. with stirring. Approximately 3 l of gaseous ammonia (rotameter) are introduced over the course of 30 minutes. After just 5 minutes, the stirred liquid phase becomes markedly cloudy as a result of the onset of salt precipitation.

After the introduction of ammonia has ended, the liquid is freed from precipitate using a filter press (Seitz K 300 filter disc). The salt cake on the filter disc consists of coarse, pale brownish crystals. The filtrate isolated is a colorless, clear liquid, which is subjected to an oil pump vacuum of about 1 mbar on a rotary evaporator for approx. 5 minutes to remove any ammonia still dissolved therein.

A $^{29}$Si NMR spectrum confirms the structural obtainment of the linear, α,ω-acetoxy group-bearing siloxane.

Example 9 (inventive)

Conversion of the purified linear acetoxysiloxane obtained in example 8 to give an SiOC-bonded, linear polydimethylsiloxane-polyoxyalkylene block copolymer of the ABA structural type in toluene with ammonia as auxiliary base A 500 ml four-neck flask with a precision glass stirrer, an internal thermometer, and a reflux condenser on top is initially charged with 96.0 g of a butanol-started, polypropyleneoxy group-containing polyetherol having an average molar mass of 1935 g/mol (determined according to respective OH number) together with 126 ml of toluene with stirring. 30.0 g of the purified, acetoxy-terminated, linear siloxane prepared in example 6 are then added. The reaction matrix is clear after only 5 minutes of stirring at 23° C. Using an inlet tube, gaseous ammonia is introduced into the reaction matrix, which continues to be stirred, in a moderate stream over the course of 45 minutes until a spot test carried out on moist universal indicator paper indicates markedly alkaline reaction.

Over a further 45 minutes, a reduced ammonia stream is introduced and the reaction mixture is heated to 50° C. Gas introduction is terminated and the mixture is allowed to cool to 23° C. before the salts present therein are removed from the liquid using a fluted filter. The clear filtrate thus obtained is freed from volatiles on a rotary evaporator at a bath temperature of 70° C. and an applied auxiliary vacuum of <1 mbar.

A colorless, clear ABA-structured polydimethylsiloxane-polyoxyalkylene block copolymer is isolated, the $^{29}$Si NMR spectrum of which confirms the target structure. The polyethersiloxane is then admixed with 0.2% of N-methylmorpholine for end-stabilization.

The invention claimed is:

1. A process for purifying acidic equilibrated acetic anhydride-containing acetoxysiloxane, wherein
   (a) the acidic acetic anhydride-containing equilibrated, acetoxysiloxane, which is optionally dissolved in an inert solvent, is contacted with a base, wherein the acetoxy siloxane contains acetic acid of from 0.4 to 3.5 per cent by weight, based on the acetoxysiloxane;
   (b) a precipitate is filtered off; and
   (c) the filtrate obtained is purified by distillation.

2. The process according to claim 1, wherein in step (a) the base introduced is ammonia,
   and thereafter the precipitate comprising ammonium triflate, ammonium acetate or acetamide, is filtered off, and then the filtrate obtained is subjected to distillation in order to remove siloxane cycles, $D_4$/$D_5$/$D_6$, and also any inert solvent used,
   wherein the contact of the siloxane with ammonia is conducted in the temperature range from 0° C. to 50° C., wherein an one- to 10-fold stoichiometric excess of ammonia, is used based on the cumulative amount of the acidic acetic anhydride-containing equilibrated acetoxysiloxane.

3. The process according to claim 1, wherein in step (a) contact is made with a solid and/or liquid base, and thereafter the precipitate, is filtered off, and then the filtrate obtained is subjected to distillation, in order to remove acetic acid, acetic anhydride, siloxane cycles and also any inert solvent used,
   wherein the solid and/or liquid base to be used comprises a hydrogen carbonate and/or carbonate of the alkali or alkaline earth metals, and/or an organic amine base, comprising primary and/or secondary amines and/or tertiary amines, hydroxyalkyl group-bearing amines selected from the group consisting of diisopropanolamine and triisopropanolamine, wherein the contact of the siloxane with a solid and/or liquid base is conducted in the temperature range from 0° C. to 140° C., and wherein a one- to 10-fold stoichiometric excess of solid and/or liquid base, is used based on the acid equivalent, to be neutralized.

4. The process according to claim 1, wherein the acetoxy group-bearing siloxanes to be purified have been prepared from cyclic siloxanes $D_4/D_5/D_6$, and/or from hydroxy group-bearing siloxanes and/or from mixtures of cyclic branched DT siloxanes using acid, as catalyst with acetic anhydride and with the addition of acetic acid or in that a linear or branched, acetoxy function-bearing siloxanes to be purified have been prepared in a reaction system comprising
a) silanes and/or siloxanes bearing alkoxy groups, and/or
b) silanes and/or siloxanes bearing acetoxy groups, and/or
c) silanes and/or siloxanes bearing hydroxy groups, and/or
d) a reaction medium comprising acetic anhydride, perfluoroalkanesulfonic acid.

5. The process according to claim 1, wherein the acetoxy group-bearing siloxanes to be purified contain acid in amounts of from 0.4 to 1.0 per cent by mass.

6. The process according to claim 1, wherein the inert solvent is selected from the group consisting of alkanes, cycloalkanes, aromatics and alkylaromatics.

7. The process according to claim 1, wherein the procedure is effected solventlessly.

8. The process according to claim 1, wherein in step (a) contact is made with a solid and/or liquid base, and thereafter a precipitate comprising trifluoromethanesulfonate salts, is filtered off, and then the filtrate obtained is subjected to distillation, in order to remove acetic acid, the acetic anhydride, siloxane cycles and any inert solvent used, wherein the solid and/or liquid base comprises a hydrogencarbonate and/or carbonate of the alkali or alkaline earth metals, and/or an organic amine base, comprising primary and/or secondary amines and/or tertiary amines, hydroxyalkyl group-bearing amines including diisopropanolamine, triisopropanolamine or an acetate salt, wherein treatment of the siloxane with a solid and/or liquid base is conducted in the temperature range from 20° C. to 110° C., wherein a one- to 5-fold stoichiometric excess of solid and/or liquid base, is used based on a trifluoromethanesulfonic acid equivalent, to be neutralized.

9. The process according to claim 1, wherein the acetoxy group-bearing siloxane to be purified contains acetic acid in amounts of from 0.8 to 1.8 per cent by weight, based on the acetoxy group-bearing siloxane to be purified.

* * * * *